(12) United States Patent
Chakraborty et al.

(10) Patent No.: US 8,873,371 B2
(45) Date of Patent: Oct. 28, 2014

(54) USER EQUIPMENT OPTIMIZATION FOR MULTIMEDIA BROADCAST MULTICAST SERVICE

(71) Applicant: Broadcom Corporation, Irvine, CA (US)

(72) Inventors: Soumen Chakraborty, Bangalore (IN); Erik Stauffer, Mountain View, CA (US)

(73) Assignee: Broadcom Corporation, Irvine, CA (US)

(*) Notice: Subject to any disclaimer, the term of this patent is extended or adjusted under 35 U.S.C. 154(b) by 66 days.

(21) Appl. No.: 13/631,254

(22) Filed: Sep. 28, 2012

(65) Prior Publication Data

US 2014/0092720 A1   Apr. 3, 2014

(51) Int. Cl.
*H04L 1/00*   (2006.01)

(52) U.S. Cl.
USPC .......................................... 370/216; 370/311

(58) Field of Classification Search
USPC ......... 370/216, 311, 312, 328, 394, 432, 473; 340/7.32–7.38; 455/343.1–343.6; 713/300; 714/746, 749, 751, 752, 758
See application file for complete search history.

(56) References Cited

U.S. PATENT DOCUMENTS

2009/0122736 A1* 5/2009 Damnjanovic et al. ....... 370/311
2010/0223533 A1* 9/2010 Stockhammer et al. ...... 714/776

* cited by examiner

*Primary Examiner* — Edan Orgad
*Assistant Examiner* — Saumit Shah
(74) *Attorney, Agent, or Firm* — Garlick & Markison; Bruce E. Garlick; Shayne X. Short

(57) ABSTRACT

A technique to receive a Multimedia Broadcast Multicast Service (MBMS) broadcast, in which a plurality of source symbols and repair symbols of a broadcast from a broadcast source are received at a User Equipment or User Device (UE). The source symbols and repair symbols are based on fountain codes, so that not all of the repair symbols are used to recover the originally sourced data. An application layer of the UE recovers the sourced data and places the receiver in a power-save mode following the last repair symbol used to recover the sourced data, so that remaining repair symbols are not received by the receiver and subsequently processed.

20 Claims, 6 Drawing Sheets

USER EQUIPMENT OPTIMIZATION FOR MULTIMEDIA BROADCAST MULTICAST SERVICE

BACKGROUND OF THE INVENTION

1. Technical Field of the Invention

The embodiments of the invention relate to wireless communications and, more particularly, to power conservation in a wireless mobile device.

2. Description of Related Art

Various wireless communication systems are known today to provide communication links between devices, whether directly or through a network. Such communication systems range from national and/or international cellular telephone systems, the Internet, point-to-point in-home systems, as well as other systems. Communication systems typically operate in accordance with one or more communication standards or protocols. For instance, wireless communication systems may operate using protocols, such as IEEE 802.11, Bluetooth™, advanced mobile phone services (AMPS), digital AMPS, global system for mobile communications (GSM), code division multiple access (CDMA), local multi-point distribution systems (LMDS), multi-channel-multi-point distribution systems (MMDS), as well as others.

Presently, in the mobile (e.g. cellular) telephone category, the trend is a transition from 3G ($3^{rd}$ Generation) to 4G ($4^{th}$ Generation). In one area of application, Long Term Evolution (LTE) is marketed as 4G LTE to provide high speed wireless data transfer to mobile phones and other mobile devices (e.g handheld devices, tablet computers, etc.). Typically, a transmitting node (such as a cellular tower) provides limited coverage within a given radius or area. The transmitting node is referred to as NodeB or eNodeB, where eNodeB stands for Evolved NodeB or E-UTRA (Universal Terrestrial Radio Access) NodeB.

For each wireless communication device, such as devices that utilize 3G and 4G communications, to participate in wireless communications, it generally includes a built-in radio transceiver (e.g., receiver and transmitter) or is coupled to an associated radio transceiver (e.g., a station for in-home and/or in-building wireless communication networks, modem, etc.). Typically, the transceiver includes a baseband processing stage and a radio frequency (RF) stage. The baseband processing provides the conversion from data to baseband signals for transmitting and baseband signals to data for receiving, in accordance with a particular wireless communication protocol. The baseband processing stage is coupled to a RF stage (transmitter section and receiver section) that provides the conversion between the baseband signals and RF signals. The RF stage may be a direct conversion transceiver that converts directly between baseband and RF or may include one or more intermediate frequency stage(s).

For handheld devices, where most or all of the components are resident in the device, the handheld device typically also includes an application processor or processors to execute various applications for the device. Although a given NodeB may communicate with multiple user devices (referred to as User Equipment or UE) within its area of transmission, generally communication links (or channels) between the NodeB and the UEs carry different signals. With separate unicast transmissions to each UE, the transmission protocols typically use an acknowledge (ACK) signal to indicate a reception of a transmission at the UE and/or a non-acknowledge (NACK) signal to indicate a non-reception or incomplete reception at the UE. In this manner, the NodeB can either transmit the next message, when the previous message is received, or retransmit the original message again, when the full message is not received at the UE.

Multimedia Broadcast Multicast Service (MBMS) is a different kind of transmission in which a broadcast from a given NodeB is communicated to multiple UEs within the transmission area. In this way, multimedia broadcasts, such as television shows, movies, concerts and other multimedia, may be simultaneously broadcast to a plurality of UEs in the area. However, unlike unicast transmissions, MBMS does not use ACK/NACK signaling to indicate reception or failure of reception of a message. This is necessitated by the desire not to overburden NodeB by the approximately simultaneous transmission of ACK/NACK signals from multiple UEs.

Instead, MBMS transmissions rely on transmitting the multimedia signal that utilize Forward Error Correction (FEC). A number of FEC schemes may be used. For example, Reed-Solomon code may be used. There is a theoretical optimal code that always decodes with k receive symbols out of N generated symbols. If N can be any number, this would be considered a fountain code. However, if N is fixed, the ideal code may be realized using a Reed-Solomon code, but it is computationally intensive. Otherwise, a non-optimal fountain code, with some small probability of failure with only k symbols, may be used. The close to optimal codes may not be optimal, but require lower computational complexity. LTE, for example, uses a fountain code that is close to optimal.

Accordingly, for MBMS transmissions, a given NodeB typically transmits K number of source symbols along with E number of repair symbols for encoding with the FEC. A selected number of repair symbols are sent to ensure that most or all of the UEs in the area are able to recover the broadcast using FEC. The unfortunate aspect of this technique is that some UEs are able to recover the broadcast with minimal number of repair symbols, while other UEs require a substantial number of repair symbols. Because all of the UEs receiving the broadcast stay active throughout the complete sequence of source and repair symbols, the UEs consume power to process all of the symbols, even when some of those repair symbols are not needed for recovering the source data.

Accordingly, there is a need to provide a technique of conserving power by shutting down the processing of repair symbols once an adequate number of repair symbols have been decoded to recover the source multimedia data.

DETAILED DESCRIPTION OF THE INVENTION

The embodiments of the present invention may be practiced in a variety of wireless communication devices that operate in a wireless environment or network. The examples described herein pertain to devices that operate within a defined area covered by a control point or node, referred to as NodeB (NB) or eNodeB (eNB). However, the practice of the invention need not be limited to such nodes. Receiving devices that receive multicast service broadcasts may operate in a variety of wireless broadcast networks having a broadcast source or sources. Likewise, the particular broadcast described herein is referred to as Multimedia Broadcast Multicast Service (MBMS). However, the invention is applicable to other forms of broadcast that utilize error correction to recover source data. Furthermore, the receiving devices that implement embodiments of the invention are termed UEs, but other device designation may be used in other instances. Also, the description below pertains to the use of an optimal code, wherein an example is described based on a code that is close to optimal. It is appreciated that fountain codes, less than optimal fountain codes, pseudo-fountain codes or other types of error correcting codes may be used. The description below also describes symbols and blocks of symbols. However, other constructs, such as frames, sub-frames, packets, etc. may readily be substituted for the described symbols herein.

Figure 1:
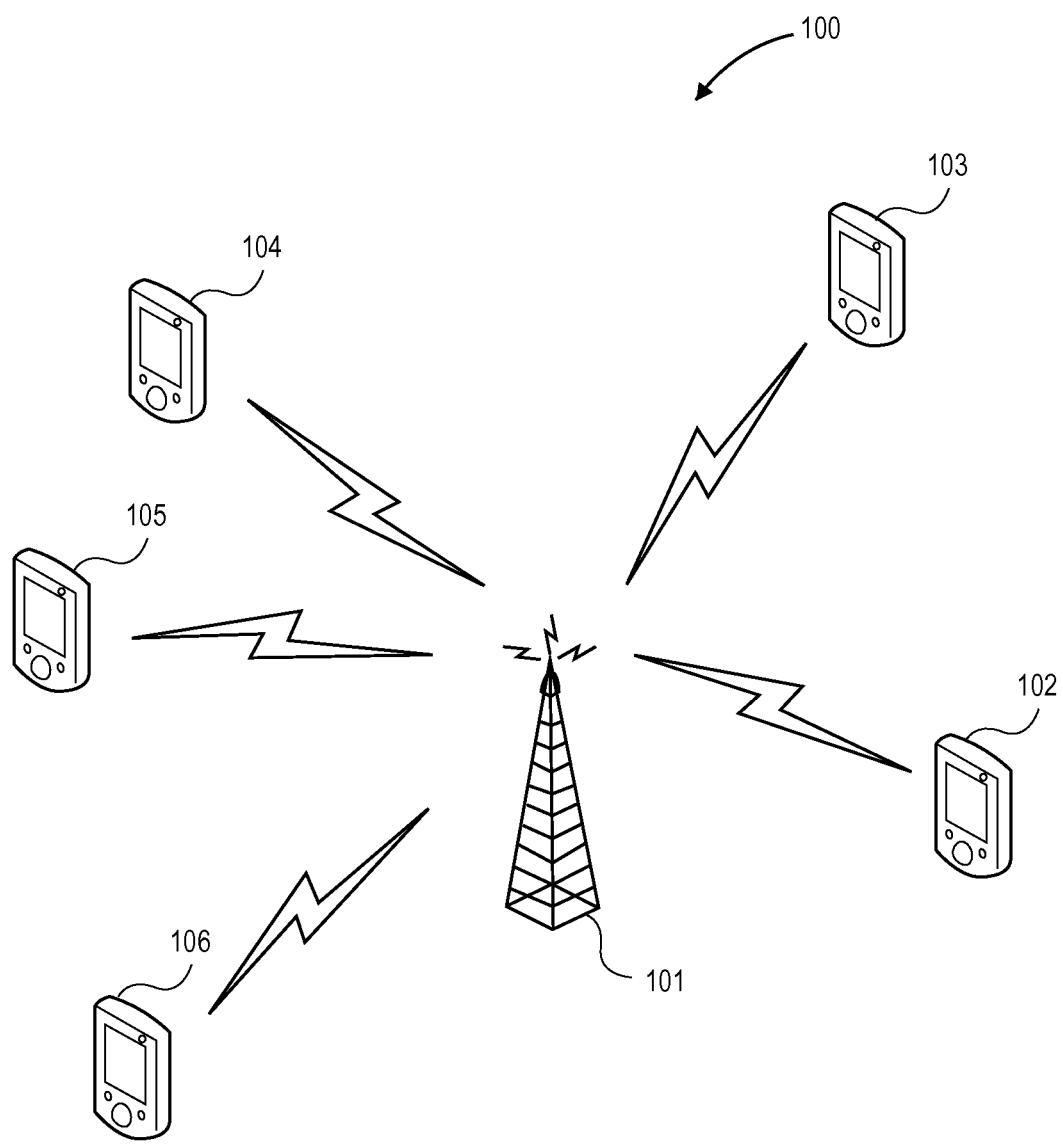
FIG. 1 is a diagram of a network in which multiple UEs are present in the network, wherein a particular eNodeB provides MBMS transmissions to the UEs in accordance with one embodiment for practicing the invention.

FIG. 1 shows a wireless network 100, which may be any type of wireless network. In one embodiment, network 100 is a mobile telephone network that operates using 3G or 4G LTE to communicate with a plurality of devices 102-106. Devices 102-106 are henceforth referred to as User Equipment (UEs) 102-106. A control point or node 101 communicates with UEs 102-106. Node 101 is referred to here as NodeB (NB) or Evolved NodeB (eNodeB or eNB) 101. However, other nodes and control points may be used in other networks. UEs 102-106 may comprise a variety of wireless devices that communicate with eNB 101. UEs 102-106 typically are mobile devices and/or handheld mobile devices, but the UEs are not limited to such devices. Generally, UEs are battery operated devices, so that the practice of the invention may be applied to conserving battery power. In one instance, one or more of the UEs 102-106 may be a mobile telephone, smartphone, tablet computer, or handheld multimedia device. UEs 102-106 may be other types of devices as well. It is to be noted that although only 5 UEs are shown in FIG. 1, other networks may have less or more UEs operating within the network. As described below, in a MBMS environment, hundreds or even thousands of UEs may be operating in network 100 and receiving the same broadcast. Generally, UEs 102-106 are transceiving (transmitting and receiving), but the invention is also applicable to devices having just a receiver.

Although eNB 101 may provide separate unicast communications to individual UEs, the aspect of the invention applies to broadcast transmissions provided by eNB 101. Accordingly, in one embodiment, eNB 101 operates as a multicast service in broadcasting multimedia to various UEs, including UEs 102-106. However, the invention need not be limited to multimedia and other forms of data may be broadcast as well. In one embodiment, the multimedia broadcast is a Multimedia Broadcast Multicast Service (MBMS). Furthermore, in one embodiment the broadcast is a MBMS broadcast pertaining to LTE.

Figure 2:
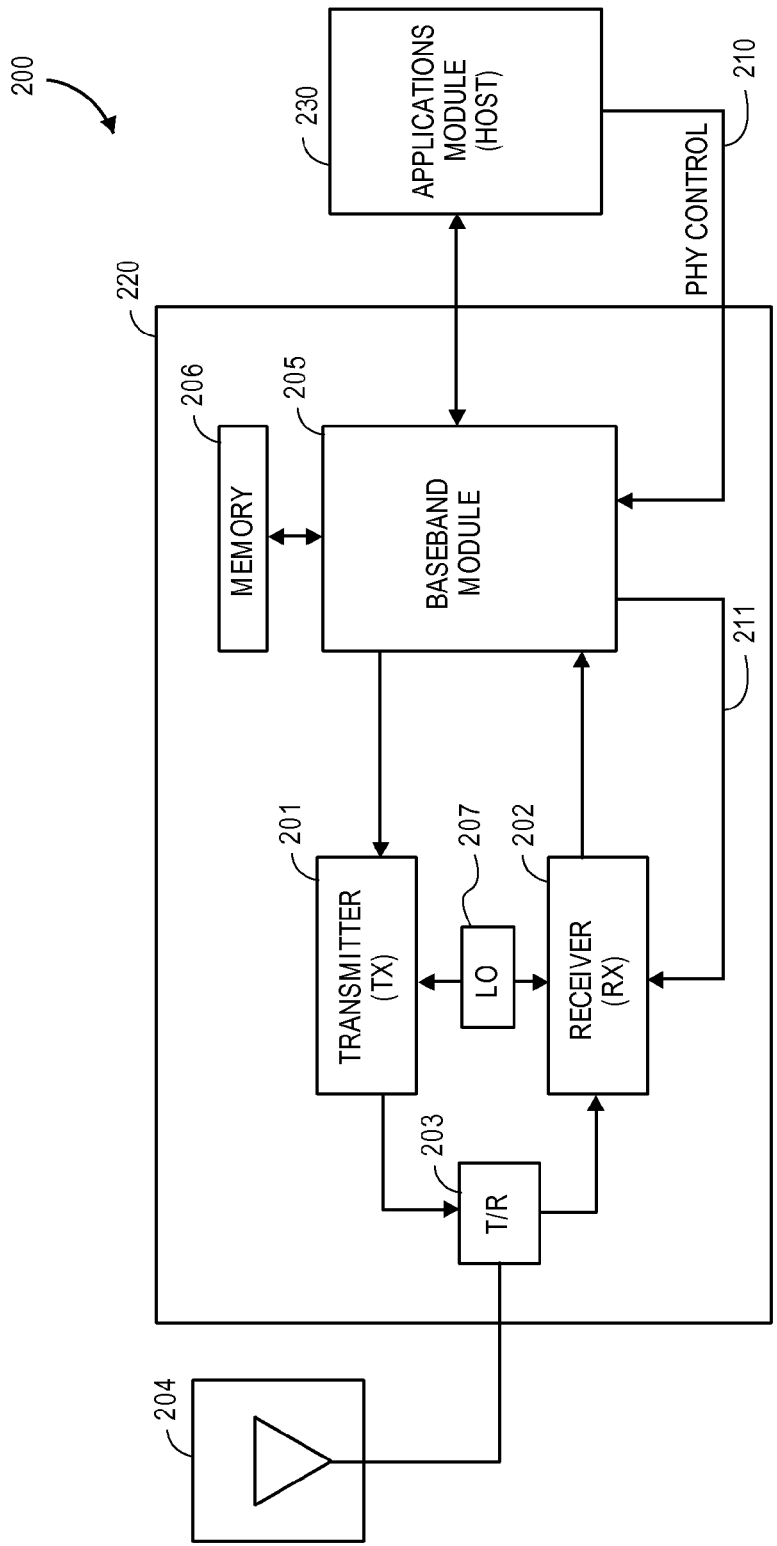
FIG. 2 is a hardware schematic block diagram showing an embodiment of a wireless communication device for use as part of an UE in accordance with one embodiment for practicing the invention.

FIG. 2 is a schematic block diagram illustrating part of a wireless communication device 200 that includes a radio 220 and applications module 230. Radio 220 includes a transmitter (TX) 201, receiver (RX) 202, local oscillator (LO) 207 and baseband module 205. Baseband module 205 includes a processor to provide baseband processing operations. In some embodiments, baseband module 205 is or includes a digital-signal-processor (DSP). Baseband module 205 is typically coupled to a host unit, applications processor or other unit(s) that provides operational processing for the device and/or interface with a user.

In the example of FIG. 2, applications module 230 may be an application processor in one instance or it may be a host unit in another instance. For example, in a notebook or laptop computer, applications module (or host) 230 may represent the computing portion of the computer, while radio 220 is utilized to provide the radio components for radio frequency (RF) transmission and reception. Similarly, for a handheld device, applications module 230 may represent the application portion of the handheld device, while radio 220 is utilized for RF communication with eNB or some other device. In a mobile phone, applications module 230 includes one or more processors to provide various applications for the mobile phone, while radio 220 provides the RF communications to communicate with eNB. Furthermore, radio 220, as well as applications module 230, may be incorporated in one or more integrated circuits.

A memory 206 is shown coupled to baseband module 205, which memory 206 may be utilized to store data, as well as program instructions that operate on baseband module 205. Various types of memory devices may be utilized for memory 206. It is to be noted that memory 206 may be located anywhere within device 200 and, in one instance, it may also be part of baseband module 205 and/or applications module 230.

Transmitter 201 and receiver 202 are coupled to an antenna assembly 204 via transmit/receive (T/R) switch module 203. T/R switch module 203 switches the antenna between the transmitter and receiver depending on the mode of operation. It is to be noted that T/R switch module may comprise a switch, power combiner, power splitter, duplexer, digital processing as well as other devices. In some instances, a T/R switch module is not used. In other embodiments, separate antennas may be used for transmitter 201 and receiver 202, respectively. Furthermore, in other embodiments, multiple antennas or antenna arrays may be utilized with device 200 to provide antenna diversity or multiple input and/or multiple output, such as MIMO, capabilities. Some embodiments may use multiple antennas. Still in other embodiments, there may be multiple transmitters and/or receivers, which may or may not share antennas.

Outbound data for transmission from applications module 230 are coupled to baseband module 205 and converted to baseband signals and then coupled to transmitter 201. Transmitter 201 converts the baseband signals to outbound radio frequency (RF) signals for transmission via antenna assembly 204. Transmitter 201 may utilize one of a variety of up-conversion or modulation techniques to convert the outbound baseband signals to outbound RF signal. Generally, the conversion process is dependent on the particular communication standard or protocol being utilized, such as LTE.

In a similar manner, inbound RF signals are received by antenna assembly 204 and coupled to receiver 202. Receiver 202 then converts the inbound RF signals to inbound baseband signals, which are then coupled to baseband module 205. Receiver 202 may utilize one of a variety of down-conversion or demodulation techniques to convert the inbound RF signals to inbound baseband signals. The inbound baseband signals are processed by baseband module 205 and inbound data is output from baseband module 205 to applications module 230. Baseband module 205 generally operates by utilizing one or more communication protocols for transmitting and receiving, such as LTE.

LO 207 provides local oscillation signals for use by transmitter 201 for up-conversion and by receiver 202 for down-conversion. In some embodiments, separate LOs may be used for transmitter 201 and receiver 202. Although a variety of LO circuitry may be used, in some embodiments, a PLL is utilized to lock the LO to output a frequency stable LO signal based on a selected channel frequency.

FIG. 2 also shows a Physical layer (PHY) control signal 210. PHY control signal 210 is described further below and is used to place the PHY into a power-conservation or power-save mode. PHY control signal is shown coupled to baseband module 205, which then controls the activity of components and circuitry. A line 211 is shown coupled to receiver 202 in FIG. 2 to control the receiver.

It is to be noted that in one embodiment, baseband module 205, LO 207, transmitter 201 and receiver 202 are integrated on the same integrated circuit (IC) chip. Transmitter 201 and receiver 202 are typically referred to as the RF front-end of radio 220. In other embodiments, one or more of these components may be on separate IC chips. Similarly, other components shown in FIG. 2 may be incorporated on the same IC chip, along with baseband module 205, LO 207, transmitter 201 and receiver 202. In some embodiments, the antenna 204 may also be incorporated on the same IC chip as well. Furthermore, with the advent of system-on-chip (SOC) integration, applications module 230, may be integrated on the same IC chip along with radio 220.

Additionally, although one transmitter 201 and one receiver 202 are shown, it is to be noted that other embodiments may utilize multiple transmitter units and receiver units, as well as multiple LOs. For example, diversity communication and/or multiple input and/or multiple output communications, such as multiple-input-multiple-output (MIMO) communication, may utilize multiple transmitters 201 and/or receivers 202 as part of the RF front-end. Furthermore, it is to be noted that FIG. 2 shows basic components for transmitting and receiving and that actual devices may incorporate other components than those shown. Device 200 or portions thereof may be incorporated within UEs 102-106 of FIG. 1.

As noted in the Background section, some forms of broadcast transmissions, such as MBMS transmissions, do not derive the benefit of HARQ/RLC (Hybrid Automatic Repeat Request/Radio Link Control) layer recovery. That is, ACK/NACK provisions related to HARQ/RLC are not utilized to inform eNB to resend the message (e.g. data), in the event of a failure to recover the message. The simultaneous (or near simultaneous) transmissions to tens, hundreds or even over a thousand UEs, precludes eNB from utilizing such recovery mechanism. Instead, MBMS transmissions rely on sending adequate FEC symbols to correct and recover the transmitted message.

Figure 3:
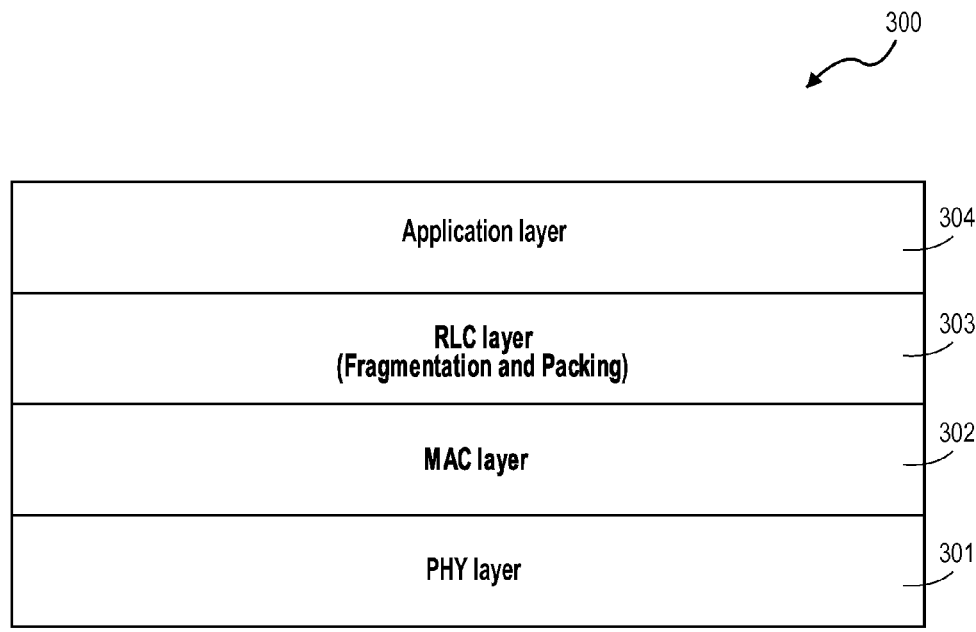
FIG. 3 shows the various layers used in decoding received symbols of a MBMS transmission in accordance with one embodiment for practicing the invention.

FIG. 3 illustrates several protocol layers. In FIG. 3, four different layers of a protocol stack 300 are shown. Only those layers pertinent to the understanding of the present invention is shown. The lowest layer is PHY layer 301, followed by Media Access Control (MAC) layer 302. A Radio Link Control (RLC) layer 303 overlies MAC layer 302, with Application layer 304 at the top of the stack 300. When receiving broadcast symbols from eNB, the received signals transition from PHY layer 301 to Application layer 304, where the received symbols are decoded and used. As noted in the above paragraph, RLC layer does not provide automatic reply (e.g. ACK/NACK signaling) to recover lost symbols containing data. Accordingly, in order to overcome this problem, broadcast signals, such as MBMS, rely on Forward Error Correction (FEC).

Figure 4:
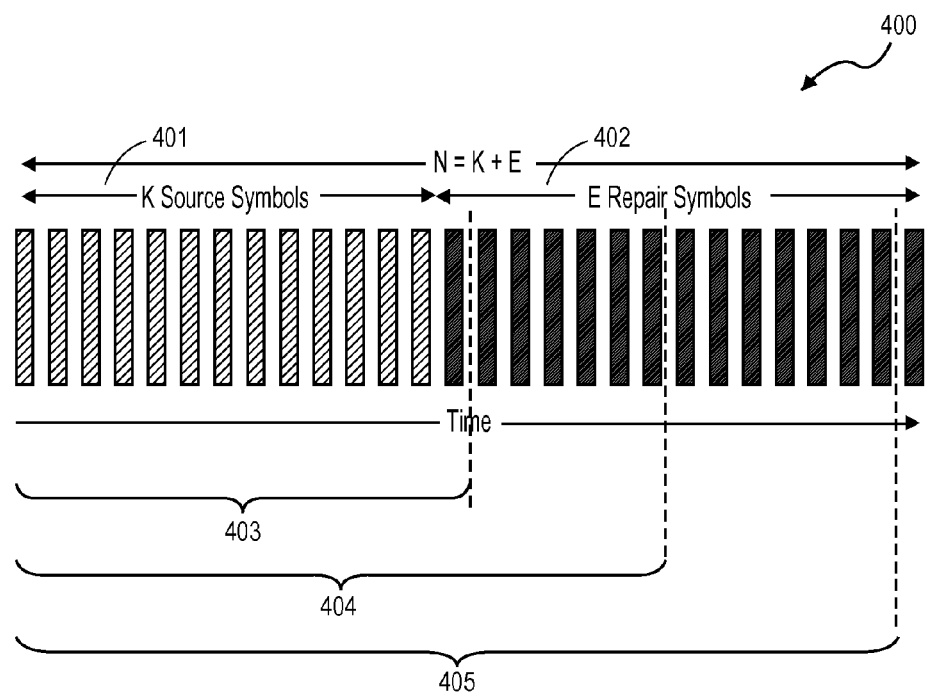
FIG. 4 shows a block of source symbols and repair symbols comprising a MBMS transmission in accordance with one embodiment for practicing the invention.

In one technique, FEC for MBMS uses close to optimal codes based on fountain codes. FIG. 4 shows an example of a close to optimal fountain code transmission 400, comprised of K source symbols 401 and E repair symbols 402. The receiver may decode the original source block containing K source symbols from any k encoding symbols out of the total K source symbols plus E repair symbols sent by the eNB, where K=k. In order for k encoded symbols to reach Application layer 304 after erasure at the lower layers 301-303, eNB typically transmits many more symbols than K source symbols. That is, eNB sends a total of K source symbols plus E repair symbols for a total of N symbols (N=K+E). Out of N symbols, a particular UE needs to recover k symbols at Application layer 304 to recover the original K source symbols. However, the total number of encoded symbols that may be erased at lower layers 301-303 typically varies from UE to UE.

As shown in an example of FIG. 4, one UE may be able to recover k symbols by using only one repair symbol beyond the K source symbols, as shown by series of symbols 403. Another UE may require seven repair symbols (shown by series of symbols 404) before k symbols may be recovered. Still another UE may require 14 repair symbols (shown by series of symbols 405) before k symbols may be recovered and decoded. The variations exist, because the channel conditions are not the same for all UEs under broadcast coverage from eNB. Since some UEs may have very good channel conditions while others have poor channel conditions, the actual number of repair symbols needed varies from UE to UE. In order to ensure that UEs having poor channel conditions can still recover k symbols, the practice is for eNB to transmit adequate number of repair symbols. Generally, an eNB determines the channel conditions on its own or converses with various UEs prior to the broadcast to determine the channel conditions. Hence, the source transmitting the K source symbols generally knows how many repair symbols are required to obtain ample broadcast coverage over the UEs.

Although sending of ample number of repair symbols may ensure recovery of k symbols by the UEs, some of the UEs with better channel conditions will receive repair symbols beyond the number needed to recover k symbols. This is because transmit overhead of a particular MBMS service is designed to meet the requirements of the UEs with the weakest channel in the user group (e.g. all the UEs receiving the same MBMS service). Thus, a particular UE continues to receive and decode repair symbols after compensating for erased symbols, even though it does not need those additional symbols. This would not be a problem, except that anytime the UE is receiving and processing any incoming symbol, power is consumed. The continued decoding of unneeded repair symbols is an unnecessary power drain on the UE.

Figure 5:
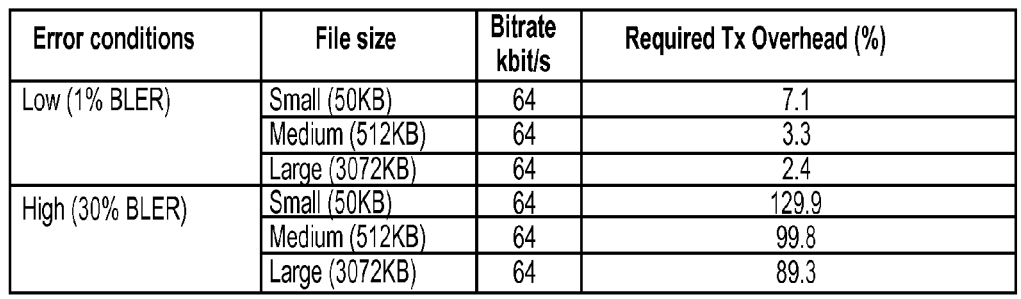
FIG. 5 shows an example table of possible error conditions when receiving a MBMS transmission in accordance with one embodiment for practicing the invention.

FIG. 5 shows an example table 450 with some required transmit (Tx) overhead for a 64 Kbit/second broadcast. The overhead pertains to a number of repair symbols needed (in percentage) beyond the K source symbols. Two error conditions are shown. A low error condition of 1% block Error Rate (BLER) and a high error condition of 30% BLER are shown for three different file sizes (50 KB, 512 KB and 3072 KB). It is to be noted that the various overhead numbers are approximate and shown as an example only. The actual values will vary depending on the network and conditions within the network.

Figure 6:
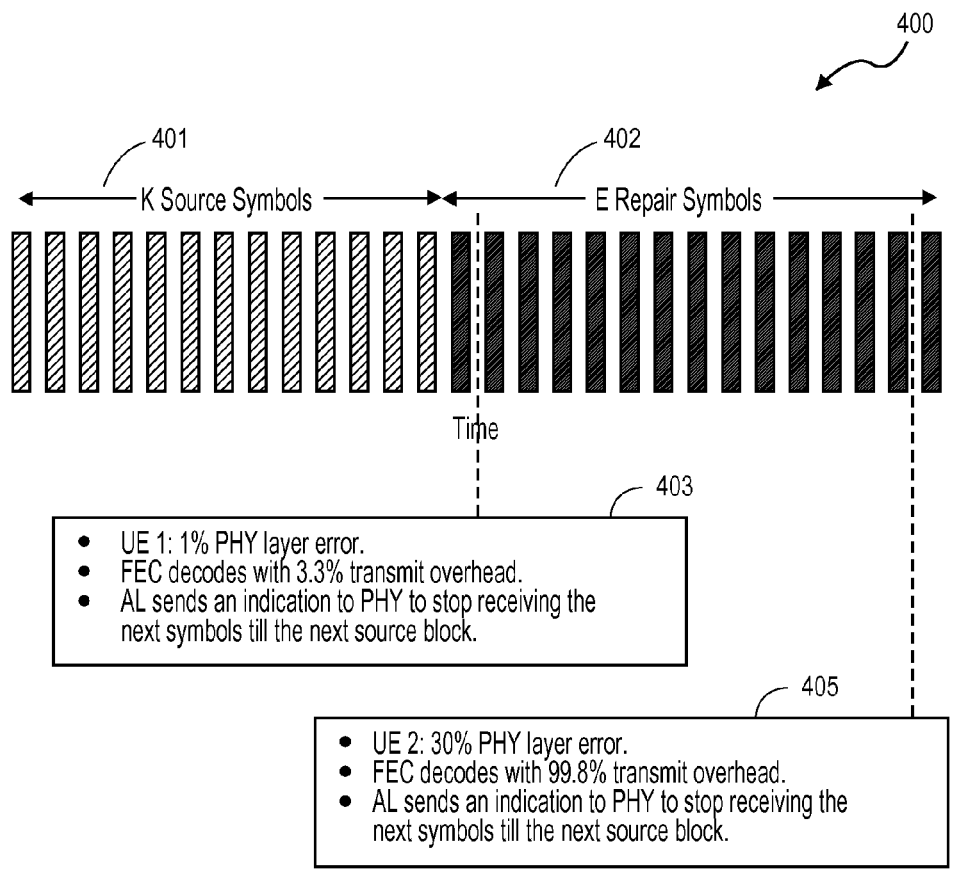
FIG. 6 shows the block of source and repair symbols of FIG. 4, in which one UE is able to recover the source data after one repair symbol, but another UE requires 14 repair symbols before the source data can be recovered in accordance with one embodiment for practicing the invention.

Note that for 512 KB file size, only about 3.3% additional repair symbols over K source symbols (Tx overhead) are needed to recover the original signal at 1% BLER for UE1. However, at 30% BLER, the overhead of repair symbols is approximately 99.8% for UE2, which means that just as many repair symbols as the number of source symbols are needed for recovery of sent data for UE2. This difference is illustrated in FIG. 6 for transmission 400 with K source symbols and E repair symbols. It is appreciated from FIG. 6 that UE1 only requires series of symbols 403 to recover the original transmission, while UE2 requires a series of symbols 405 (see also FIG. 4), which is a substantial difference from UE1.

In order to conserve power in a battery-operated mobile device that is the UE, an embodiment of the invention stops receiving additional repair symbols, once enough repair symbols are received to decode the k symbols at the UE. In this manner UE1 may stop receiving further repair symbols after the first repair symbol. UE2 would only stop receiving further repair symbols after recovering its k symbols. Thus, for the example of FIG. 6, UE1 would conserve power by entering into a low-power or power-save mode of operation after receiving the first repair symbol. This technique of having a power-save mode optimizes the battery life for UEs with a good link for decoding MBMS data, by ensuring that after k symbols are received at the application layer, subsequent MBMS symbols (or sub-frames) are not received and processed until a new source block of symbols is transmitted.

It is to be appreciated that a variety of techniques may be used to cause a UE to enter into a power-save mode. In one embodiment, when Application layer 304 (shown in FIG. 3) receives an adequate number of symbols to recover the k symbols, Application layer 304 sends an indication (such as an indication signal) to PHY layer 301 to stop receiving further symbols. Sending the indication to PHY layer 301 stops the reception of further symbols at the lowest layer of stack 300. From a hardware perspective, this PHY control indication is also shown in FIG. 2 where the Applications Module 230 sends the PHY Control signal to baseband module 205 to switch off the receive chain. It is appreciated that this is but one example of how to stop further symbols once k symbols have been recovered. Other embodiments may employ different techniques.

Figure 7:
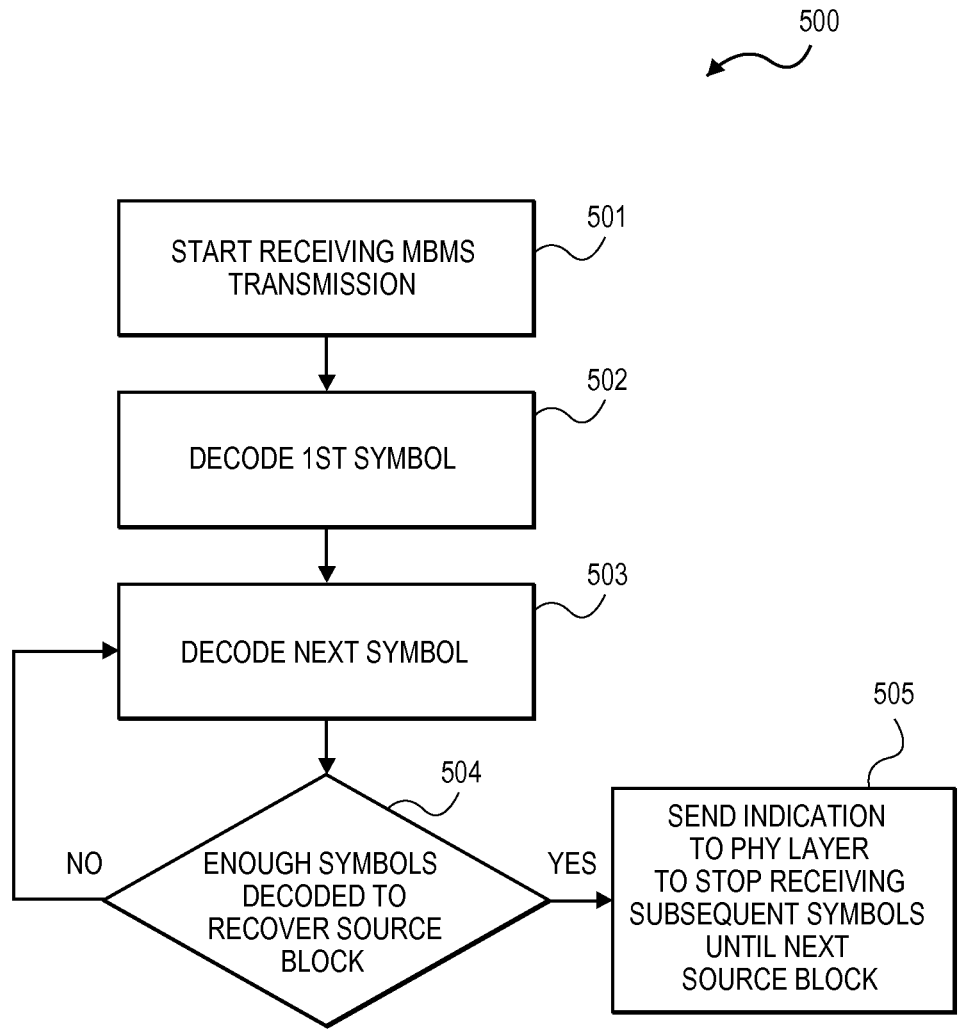
FIG. 7 shows a flow chart showing the processing steps by an UE to recover the source data in accordance with one embodiment for practicing the invention.

FIG. 7 shows a flow chart 500 illustrating a method for practicing an embodiment of the invention. The UE starts to receive MBMS transmission (block 501) and decodes the first symbol of the transmitted source block (block 502). Then, the UE decodes the next symbol (block 503) and checks to determine if enough symbols have been decoded to recover the source block (block 504). If not enough symbols have been received, then the UE starts to decode the next symbol (block 503). Whenever enough symbols have been decoded to recover the transmitted source block, an indication is sent to the PHY layer to stop receiving subsequent symbols until the next block of symbols (block 505).

It is to be noted that once the UE enters into a power-save mode, the UE should be ready to re-enter the normal active mode when the next transmission is sent from eNB. A variety of techniques may be used to inform the PHY layer to resume receiving the next set or block of symbols. In one embodiment for streaming data, the UE is made aware of the protection period boundary for blocks of multimedia data streamed from the eNB. That is, prior to the transmission of streaming data from the eNB, the UE is made aware of the duration of the streamed symbols and the protection period boundary between the blocks of symbols that are streamed in the broadcast. The duration of the streamed symbols and the protection period boundary may be a known value (such as that set by a standard) or may be informed by the eNB prior to the streaming. The UE sets its timer so that it knows the start of the next block of streamed data and is awake to receive the start of the next block of symbols. In another embodiment for non-streamed data, the eNB may provide the download delivery boundary for each block of data, so that the UE is aware of the next block transmission. Other information that may be provided for scheduling of source blocks include, but are not limited, duration of message (e.g. block of symbols), number of messages and absolute start time of messages. Any type of scheduling information regarding the timing or scheduling of blocks of symbols may be provided to the UE prior to the initial transmission (or even during transmission), so that once the UE enters into the power-save mode the UE is aware of the next block of symbols being transmitted, allowing the UE to be awake for the next block of symbols. Accordingly, there are many ways to ensure that the PHY layer is ready and awake to receive the next block of transmissions.

Furthermore, the technique described above may be implemented as a modification in protocols and/or standards applicable to MBMS, such as 4G LTE. However, even without modifying an existing standard, UEs may practice the invention by having the broadcast source identify the time periods relating to the data and separation between data blocks, so that the UE may be out of the power-save mode when needed to receive the subsequent block of data.

Figure 8:
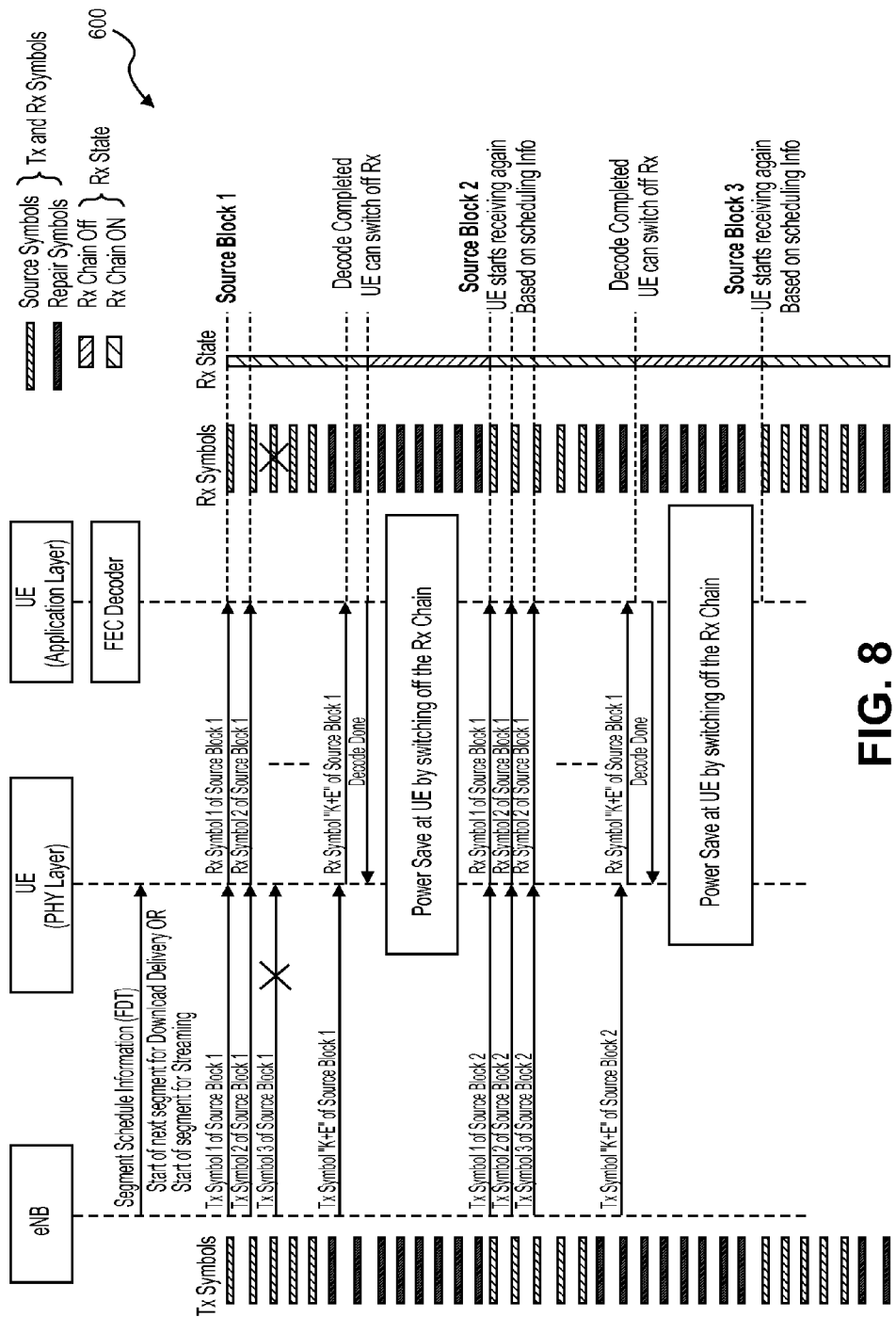
FIG. 8 shows a sequence of events between eNodeB, UE PHY layer and UE Application layer in processing MBMS transmissions from eNodeB.

FIG. 8 shows a sequence of events 600 between eNB, UE PHY layer and UE application layer in processing MBMS transmissions from eNB. FIG. 8 is just one example of how the events 600 transpire between eNB and an Application layer of one UE in a multiple UE broadcast environment. Prior to the transmission of the source block of data, a segment schedule information (in way of a File Descriptor Table or FDT) is transferred to notify the UE as to the start of the next segment for download delivery or streaming. Then, symbols of source block 1 are sent by eNB. Note that in this example, symbol 3 is erased and does not make it to the Application layer. However, the erased symbol information is recovered by decoding one or more repair symbols. The source and repair symbols transmitted are shown under Tx symbols (see legend) and the received symbols are shown as Rx symbols.

Once adequate number of source symbols and repair symbols are decoded, the UE saves power by switching off the receiver (Rx) chain by sending a Decode Done indication (PHY Control signal in FIG. 2). The Rx state is shown next to the Rx symbols and coded based on when the receive chain is on or off (see Rx state legend). Subsequently, based on the schedule information, the UE powers up to receive source block 2 of the symbols. When the decoding is complete to recover the sourced data, the UE enters the power-save mode by switching off the Rx chain, until source block 3 is ready for reception. The process repeats until the file transfers are completed.

Thus, by practicing an embodiment of the invention, mobile devices (e.g. UEs) receiving MBMS transmission may optimize power by shutting off circuitry and/or processes after enough symbols are received to recover the source data from a broadcasting source. The technique allows UEs with a good channel condition to shut down the receive chain for many of the MBMS symbols or sub-frames to save power. In some instances the ON time of a receiver may be reduced as much as 50% or more during a broadcast.

The embodiments of the present invention have been described above with the aid of functional building blocks illustrating the performance of certain functions. The boundaries of these functional building blocks have been arbitrarily defined for convenience of description. Alternate boundaries could be defined as long as the certain functions are appropriately performed. One of ordinary skill in the art may also recognize that the functional building blocks, and other illustrative blocks, modules and components herein, may be implemented as illustrated or by discrete components, application specific integrated circuits, processors executing appropriate software and the like or any combination thereof.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information.

We claim:

1. A method for execution by a communication device, the method comprising:
   receiving, at a receiver of the communication device, a plurality of source symbols and a plurality of repair symbols of a broadcast from a broadcast source, in which an acknowledgment of reception or non-reception of the plurality of source and the plurality of repair symbols is not sent to the broadcast source for retransmission of the source and repair symbols, and in which the repair symbols are used for error correction of the source symbols to recover sourced data present in the source symbols;
   decoding at least one of the plurality of repair symbols, on a symbol by symbol basis, and stopping decoding of any additional repair symbol of the plurality of repair symbols when fewer than all and enough of the plurality of repair symbols are decoded to recover at least one erased source symbol of the plurality of source symbols; and
   decoding the plurality of source symbols using the decoded fewer than all and enough of the plurality of repair symbols to recover the sourced data; and
   disregarding at least one remaining repair symbol within the plurality of repair symbols that follows the fewer than all and enough of the plurality of repair symbols that are decoded, and subsequently placing the receiver in a power-save mode.

2. The method of claim 1 further comprising:
   prior to the receiving of the plurality of source and the plurality of repair symbols, receiving scheduling information regarding timing of blocks of symbols.

3. The method of claim 2 further comprising:
   waking the receiver based on the scheduling information to receive another block of symbols containing another plurality of source symbols and another plurality of repair symbols.

4. The method of claim 1, wherein the sourced data is Multimedia Broadcast Multicast Service transmitted data.

5. The method of claim 1 further comprising:
   placing the receiver in the power-save mode by controlling a Physical (PHY) layer of the receiver to stop receiving any other repair symbol.

6. The method of claim 1, wherein the plurality of source symbols and the plurality of repair symbols are based on a code for forward error correction to recover the sourced data.

7. The method of claim 1, wherein the communication device is a battery-operated wireless communication device.

8. A method for execution by a communication device, the method comprising:
   receiving, at a receiver of the communication device, scheduling information regarding timing of blocks of symbols for a Multimedia Broadcast Multicast Service (MBMS) from a broadcast source, in which each block of symbols contains a plurality of source symbols followed by a plurality of repair symbols and in which the repair symbols are used for forward error correction of the source symbols to recover sourced data present in the source symbols, wherein an acknowledgment of reception or non-reception of the plurality of source and repair symbols is not sent to the broadcast source for retransmission of the source and repair symbols;
   receiving, at a receiver, an MBMS block of symbols transmitted from the broadcast source;
   operating an application layer of the receiver to decode at least one of the plurality of repair symbols of the MBMS block of symbols, on a symbol by symbol basis, and stopping decoding of any additional repair symbols of the plurality of repair symbols of the MBMS block of symbols when fewer than all and enough of the plurality of repair symbols are decoded to recover at least one erased source symbol of the plurality of source symbols; and
   decoding the plurality of source symbols of the MBMS block of symbols using the decoded fewer than all and enough of the plurality of repair symbols of the MBMS block of symbols to recover sourced data within the plurality of source symbols;
   disregarding at least one remaining repair symbol within the plurality of repair symbols of the MBMS block of symbols that follows the fewer than all and enough of the plurality of repair symbols of the MBMS block of symbols that are decoded, and subsequently placing the receiver in a power-save mode.

9. The method of claim 8 further comprising:
   waking the receiver from the power-save mode based on the scheduling information to receive another MBMS block of symbols from the broadcast source.

10. The method of claim 8 further comprising:
    placing the receiver in the power-save mode by switching off a Physical (PHY) layer of the receiver to stop receiving any other repair symbol.

11. The method of claim 8, wherein the plurality of source symbols and the plurality of repair symbols are based on a code for forward error correction to recover the sourced data.

12. The method of claim 8, wherein the plurality of source symbols and the plurality of repair symbols are based on a close to optimal fountain code to recover the sourced data.

13. The method of claim 8, wherein the communication device is a battery-operated wireless communication device.

14. An apparatus comprising:
- a radio that includes a receiver configured to receive a broadcast from a broadcast source and a baseband processor configured to perform provide baseband processing of the received broadcast based on a communication protocol to provide a plurality of source symbols and a plurality of repair symbols, in which an acknowledgment of reception or non-reception of the plurality of source and the plurality of repair symbols is not sent to the broadcast source for retransmission of the source and repair symbols; and
- a processor to configured to:
  - decode at least one of the plurality of repair symbols, on a symbol by symbol basis, and stopping decoding of any additional repair symbol of the plurality of repair symbols when fewer than all and enough of the plurality of repair symbols are decoded to recover at least one erased source symbol of the plurality of source symbols; and
  - decode the plurality of source symbols using the decoded fewer than all and enough of the plurality of repair symbols to recover the sourced data; and
  - disregard at least one remaining repair symbol within the plurality of repair symbols that follows the fewer than all and enough of the plurality of repair symbols that are decoded, and subsequently placing the apparatus in a power-save mode.

15. The apparatus of claim 14, wherein the processor is further configured to receive, prior to receiving the plurality of source symbols and the plurality of repair symbols, scheduling information regarding timing of blocks of symbols.

16. The apparatus of claim 15, wherein the processor is further configured to wake the apparatus from the power-save mode based on the scheduling information to receive another plurality of source symbols and another plurality of repair symbols.

17. The apparatus of claim 14, wherein the sourced data is Multimedia Broadcast Multicast Service transmitted data.

18. The apparatus of claim 14, wherein the communication protocol is based on a telephone protocol.

19. The apparatus of claim 14, wherein the plurality of source symbols and the plurality of repair symbols are based on a code for forward error correction to recover the sourced data.

20. The apparatus of claim 14 further comprising:
- a battery-operated wireless communication device.

* * * * *